US006765913B1

(12) United States Patent
Lowe et al.

(10) Patent No.: US 6,765,913 B1
(45) Date of Patent: Jul. 20, 2004

(54) BANDWIDTH MANAGER LINKED LIST OPTIMIZATION SCHEME IN A DIGITAL LOOP CARRIER SYSTEM

(75) Inventors: Thad W. Lowe, Tulsa, OK (US); Brian Christian Smith, Broken Arrow, OK (US)

(73) Assignee: Telstrat International, Plano, TX (US)

( * ) Notice: Subject to any disclaimer, the term of this patent is extended or adjusted under 35 U.S.C. 154(b) by 0 days.

(21) Appl. No.: 09/334,128

(22) Filed: Jun. 15, 1999

(51) Int. Cl.[7] .............................................. H04L 12/28
(52) U.S. Cl. ................... 370/395.21; 370/442
(58) Field of Search ................ 370/351–358, 370/395.21, 395.41, 442

(56) References Cited

U.S. PATENT DOCUMENTS

| | | | |
|---|---|---|---|
| 4,740,963 A | 4/1988 | Eckley | 370/110.1 |
| 5,757,801 A | 5/1998 | Arimilli | 370/444 |
| 5,781,320 A * | 7/1998 | Byers | 398/56 |
| 6,289,097 B1 * | 9/2001 | Gregory et al. | 379/338 |
| 6,353,609 B1 * | 3/2002 | Ethridge et al. | 370/352 |

\* cited by examiner

Primary Examiner—Wellington Chin
Assistant Examiner—Brenda Pham
(74) Attorney, Agent, or Firm—Schwegman, Lundberg, Woessner & Kluth, P.A.

(57) ABSTRACT

A method and apparatus are provided for efficiently managing bandwidth operative in a digital loop carrier system. The system includes service cards connectable to at least one transport card having a given bandwidth capacity. Each of the service cards supports multiple subscriber channels. Upon initiation of a first call, the system allocates the call to a given time slot of the transport card. The given time slot is assigned a given default bandwidth, e.g., 64 kbps. While the first call is in progress, the system determines whether the call is voice or data. If the first call is voice, the system may selectively reduce the given default bandwidth allocated to the first call if necessary to ensure that a second call, if initiated while the first call remains in progress, can be assigned the given default bandwidth. Efficient bandwidth management is provided by an inventive linked list optimization scheme, which includes a linked list of words, each associated with a time slot. The linked list is periodically searched to identify words whose associated time slots have not been analyzed to determine if a call allocated to the time slot is a voice or data call. To increase processing efficiency, only the identified time slots are analyzed.

22 Claims, 10 Drawing Sheets

BANDWIDTH MANAGER LINKED LIST OPTIMIZATION SCHEME IN A DIGITAL LOOP CARRIER SYSTEM

BACKGROUND OF THE INVENTION

1. Technical Field

The present invention relates generally to bandwidth management in digital loop carrier (DLC) systems and, more particularly, to bandwidth management including a scheme for optimized linked list processing.

2. Description of the Related Art

DLC systems have been an important part of local exchange carrier line deployment for over 15 years. They reduce the copper cabling used in local loops, which comprise the physical connection between a subscriber's premises and the telecommunications network provider. A DLC system consolidates multiple individual subscriber telephone lines into one or more copper or fiber carrier lines extending from the subscriber area to the network provider central office (CO). DLC systems thereby enable network providers to leverage investments in copper cable in the field by allowing it to transport more subscribers in larger geographic areas.

It has become increasingly important to scale networks to higher speed technologies such as, e.g., digital subscriber line (xDSL) technology, integrated synchronous digital network (ISDN) and other services. These technologies allow data to be transmitted over standard copper cable at speeds of several megabits of data per second. Many factors are driving the need for faster transport capabilities, the most significant of which is increased Internet usage by subscribers.

The resulting increased network traffic has caused bottlenecking in existing DLC systems because of the finite bandwidth capacity of the carrier line infrastructure leading to the CO. A tremendous need thus exists for increasing the capacity and flexibility of existing carrier line infrastructure.

A known method for increasing available bandwidth in existing communication networks comprises compressing all loop traffic (namely, both voice frequency and data) using compression techniques such as adaptive pulse code modulation (ADPCM) and other compression algorithms. While voice signals can generally be compressed without significant degradation, compression has a detrimental effect on the quality and bit rate of data transmission. Consequently, compression techniques are not widely used in loop systems.

BRIEF SUMMARY OF THE INVENTION

A primary object of the invention is to provide a method and apparatus for intelligently and efficiently managing bandwidth in a DLC system by rapidly identifying and selectively compressing signals that can be compressed without significant degradation.

Another object of the invention is to provide a bandwidth management scheme for a DLC system that includes a linked list optimization scheme for efficiently identifying calls requiring analysis for compressibility.

A further object of the invention is to provide a bandwidth management scheme for a DLC system that includes a linked list optimization scheme containing an active scan list of calls requiring analysis for compressibility.

These and other objects are accomplished by a method and apparatus for efficiently managing bandwidth in a DLC system. In a preferred embodiment, the system includes service cards connectable to at least one transport card having a given bandwidth capacity. Each of the service cards supports multiple subscriber channels. Upon initiation of a first call, the system allocates the call to a given time slot of the transport card. The given time slot is assigned a given default bandwidth, e.g., 64 kbps. While the first call is in progress, the system determines whether the call is voice or data (e.g., modem). If the first call is voice, the system may selectively reduce the given default bandwidth allocated to the first call if necessary to ensure that a second call, if initiated while the first call remains in progress, can be assigned the given default bandwidth. Thus, each new call is ensured of getting at least the default bandwidth when initiated.

Efficient bandwidth management is provided by an inventive linked list optimization scheme, which includes a linked list of words, each associated with a time slot. The linked list is periodically searched to identify words whose associated time slots have not been analyzed to determine if a call allocated to the time slot is a voice or data call. For rapid processing, only the identified time slots are analyzed. Thus, the present invention optimizes linked list processing by the DSP by avoiding unnecessary time slot analysis. Accordingly, while the system may be handling thousands of time slots at a given time, the DSP analyzes only those time slots whose analysis has not been completed. The system is thereby able to more quickly and efficiently process the time slot linked list.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings, in which.

DETAILED DESCRIPTION OF THE PREFERRED EMBODIMENT

Figure 1:
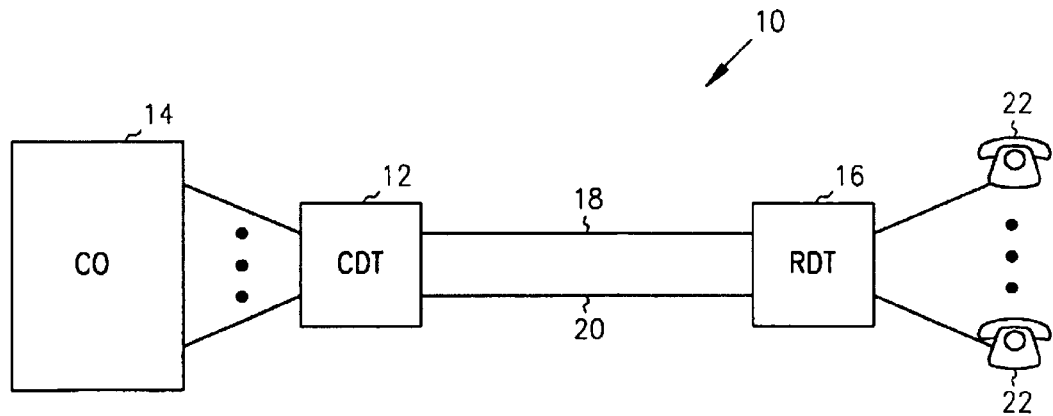
FIG. 1 is a schematic block diagram illustrating a DLC system in accordance with the invention.

FIG. 1 illustrates a DLC system 10 according to the present invention. Certain aspects and features of the inventive bandwidth management solution used in the system may be implemented in network architectures other than DLCs. However, for convenience of illustration, the invention is described in the context of a DLC system.

The system 10 preferably includes a Central Digital Terminal (CDT) 12, which is located at the CO 14 (i.e., local exchange switch), and a Remote Digital Terminal (RDT) 16, which is located near subscribers. The CDT 12 and the RDT 16 are connected by one or more media 18, 20 such as carrier lines (e.g., copper, coaxial cable, and optical fiber lines) and wireless media.

The RDT 16 generally serves as a multiple line network node providing services to multiple subscribers 22. Both digital and analog services can be provided including POTS, coin, broadband, ISDN, frame relay, ATM, universal voice grade (UVG), and other services.

The DLC system shown in FIG. 1 is a point-to-point system. It should be noted, however, that the invention can be implemented in a variety of network topologies including star, ring, drop and insert, and star from remote terminals topologies or some combination thereof.

Figure 2:
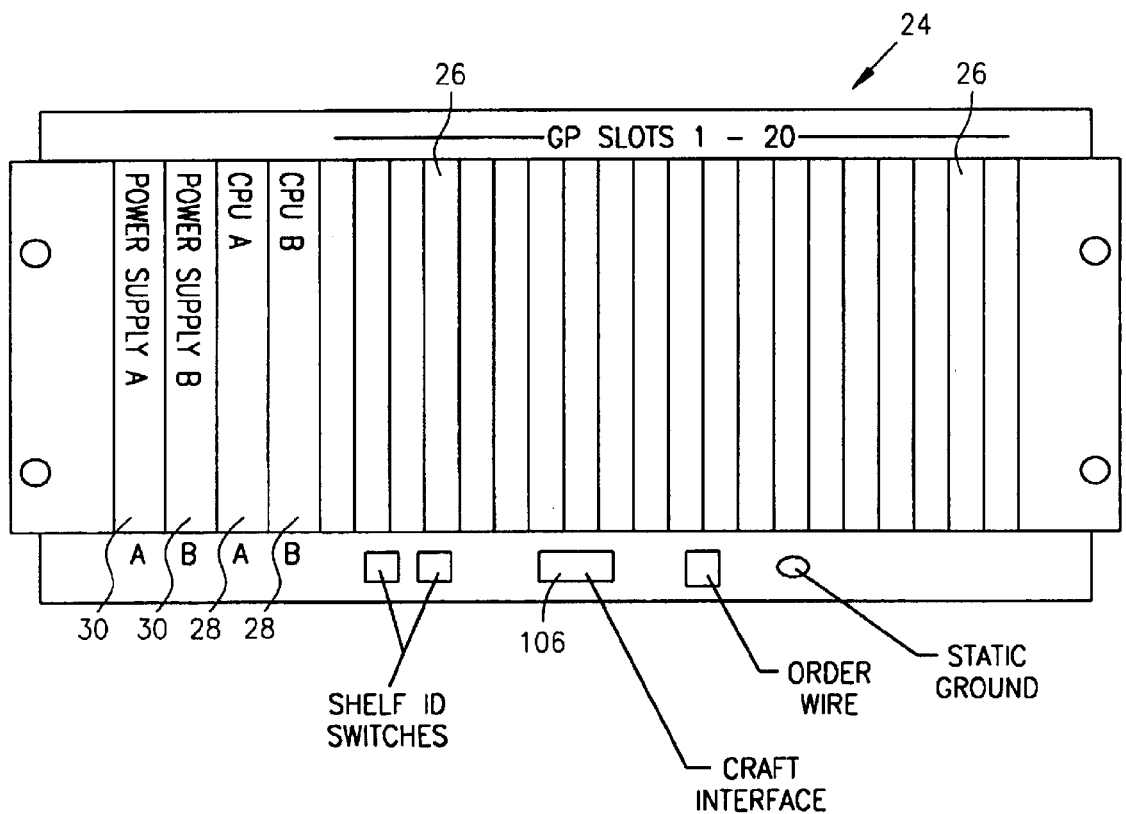
FIG. 2 is a front view of a Central Digital Terminal (CDT) of the DLC system in accordance with the invention.

The CDT and RDT units preferably are functionally similar, each preferably comprising a channel bank assembly, an example of which (for the CDT) is shown in FIG. 2. The CDT channel bank assembly 24 has a plurality of slots 26 for receiving various operating cards. (The RDT typically includes fewer slots since the CDT typically serves more than one RDT.) The slots 26 include preferably two Central Processing Unit (CPU) slots (for redundancy) for receiving CPU cards 28, two power supply slots (also for redundancy) for receiving power supply cards 30, and multiple general purpose slots. The general purpose slots are equipped with various service cards (e.g., POTS cards) and so-called transport cards for providing phone and data services to customers.

The unit 24 preferably has inter-shelf connectivity through a backplane; it can be easily expanded by linking additional channel bank assemblies to a primary shelf by means of a fiber optic cable (not shown) in a daisy-chain formation.

Figure 3:
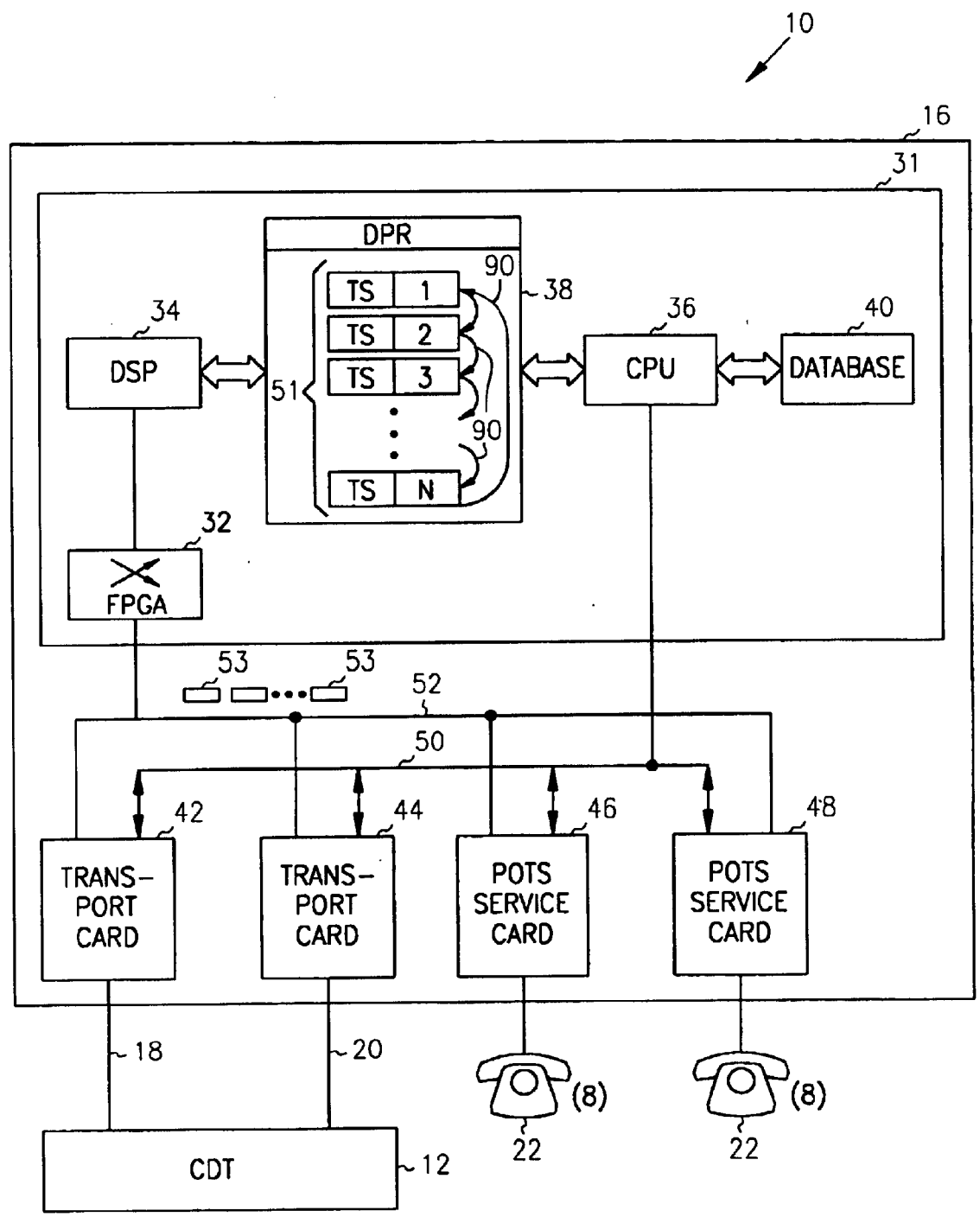
FIG. 3 is a schematic block diagram illustrating functional components of a Remote Digital Terminal (RDT) in accordance with the invention.
Figure 4:
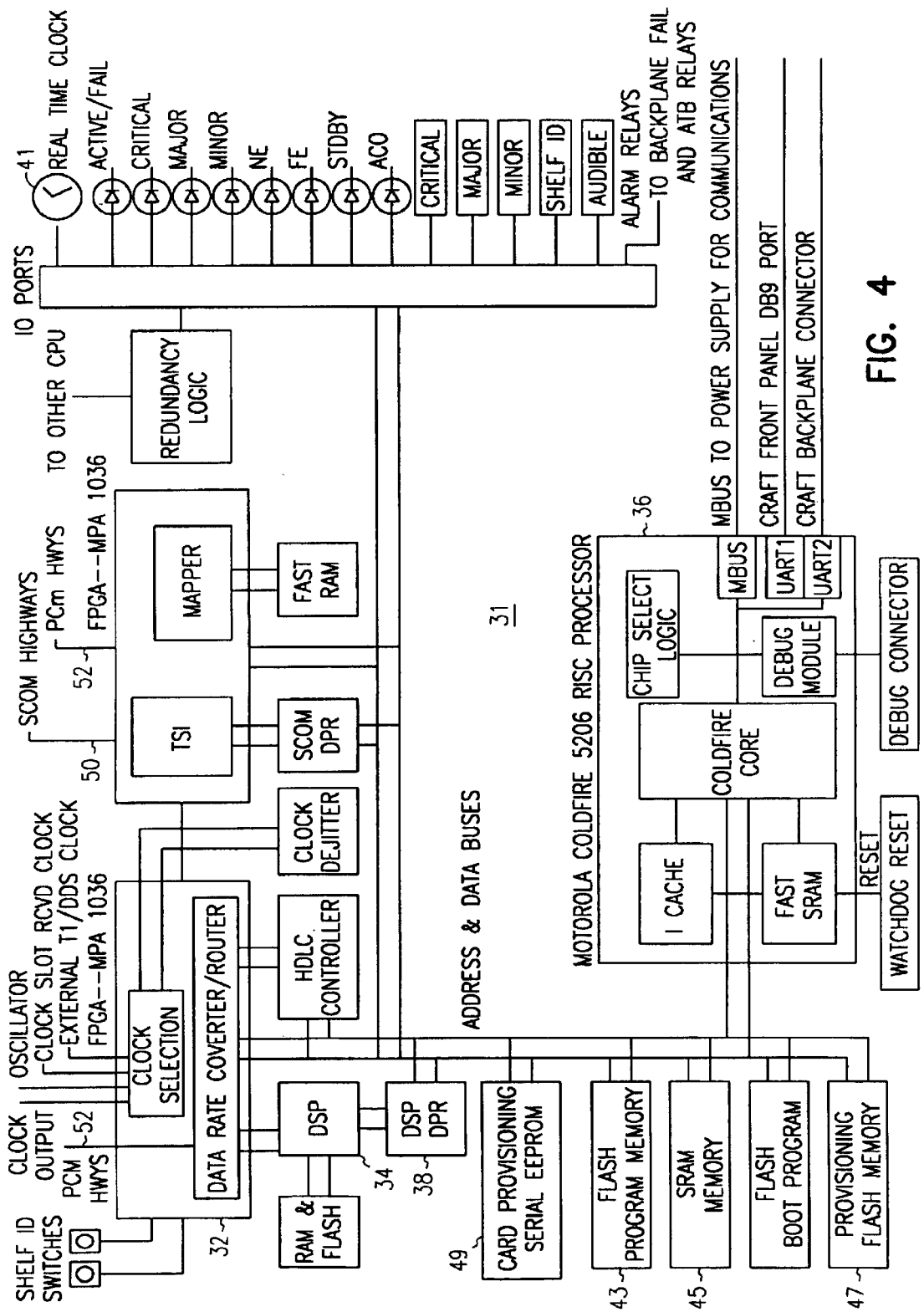
FIG. 4 is a schematic block diagram illustrating in greater detail the functional components of the CPU card of the RDT.

FIG. 3 illustrates in general the operation of the RDT 16. The RDT 16 includes a CPU card 31, a more detailed block diagram of which is shown in FIG. 4. The CPU card 31 is designed for system wide control. It provides bandwidth management and control, alarm management, maintenance and testing, timing generation, and system provisioning.

The CPU card 31 includes a Field Programmable Gate Array (FPGA) 32, a digital signal processor (DSP) 34, a CPU 36, a dual port random access memory (DPR) 38, which interfaces the CPU 36 to the DSP 34, and a database 40. The CPU card 31 also includes a low power real time clock 41 for time stamping alarms and system activities.

The CPU 36 is the controlling element of each shelf. The CPU 36 is preferably designed to operate in either stand-alone or redundant configurations. In the embodiment described herein, the CPU 36 preferably comprises a Motorola MCF5206 Coldfire processor. It should be noted, however, that a variety of other processors capable of performing the functions described herein can alternatively be used. The 5206 processor runs on a 16 bit bus with 16 bit program and data memory spaces defined. The architecture provides dynamic bus sizing options to provide support for 8 bit peripherals. The architecture is based on a Reduced Instruction Set Computing (RISC) core that provides extremely efficient, high speed operation.

The CPU 36 is preferably supported by various memory units. A 32 Megabyte (1.5M×16) flash memory 43 is provided for program storage. A 16 Megabyte (1M×16) SRAM memory 45 is provided for storage of program data. A 4 Megabyte (512k×8) flash memory 47 is provided for configuration and provisioning. A serial EEPROM 49 is also provided for card provisioning.

The CPU 36 controls traffic based on information received from the DSP 34. It also controls a linked list 51 in the DPR 38, which contains information including data on time slot allocation, by adding and removing items from the list.

The FPGA 32 provides access to the DSP 34. The FPGA 32 can be remotely modified to change system hardware as desired.

Among other functions, the DSP 34 samples and analyzes traffic to determine if traffic in a particular time slot is voice or data using an algorithm described below with reference to FIGS. 11a–11c. After analyzing the time slot, the DSP 34 updates the DPR linked list 51 with its last evaluation of the sample it took. Linked list processing by the DSP 34 will be described below in greater detail with reference to FIGS. 7–9.

The database 40 contains current and historical traffic information for use in network planning and operation, as will also be described below.

The RDT 16 also includes one or more transport cards 42, 44 (two transport cards are shown in FIG. 3) connected to one or more service cards 46, 48 (two POTS service cards are shown). There are "n" service cards per transport card. A systems communications bus 50 connects each of the cards and CPU 36 for carrying control signals. The bus 50 is a time division multiplex (TDM) bus. A pulse code modulation (PCM) bus 52 comprising a plurality of PCM highways connects the service cards 46, 48 and the transport cards 42, 44 for traffic flow.

The service cards 46, 48 shown each provide POTS service to a plurality of subscribers 22. For example, the POTS service cards 46, 48 can contain eight channels servicing eight subscribers. Though not shown, the system can include a variety of other service cards providing other services such as coin, digital, broadband, ISDN, frame relay, ATM, UVG and other services.

The transport cards 42, 44 of the RDT 16 are connected to corresponding transport cards (not shown) in the CDT 12 by various media (e.g., carrier lines and wireless media). The transport cards provide a high speed link between the RDT 16 and the CDT 12. In the FIG. 3 system, one set of transport cards is connected by an optical fiber line 18, and the other set of transport cards 44 is connected by copper cabling 20 supporting one of a variety of protocols including ISDN, MDSL, HDSL, ADSL and T1, which have varying bandwidth capacities. The bandwidth can be divided into time slots 53 having a given bandwidth, e.g., 64 kbps, 32 kbps or 16 kbps.

Figure 5:
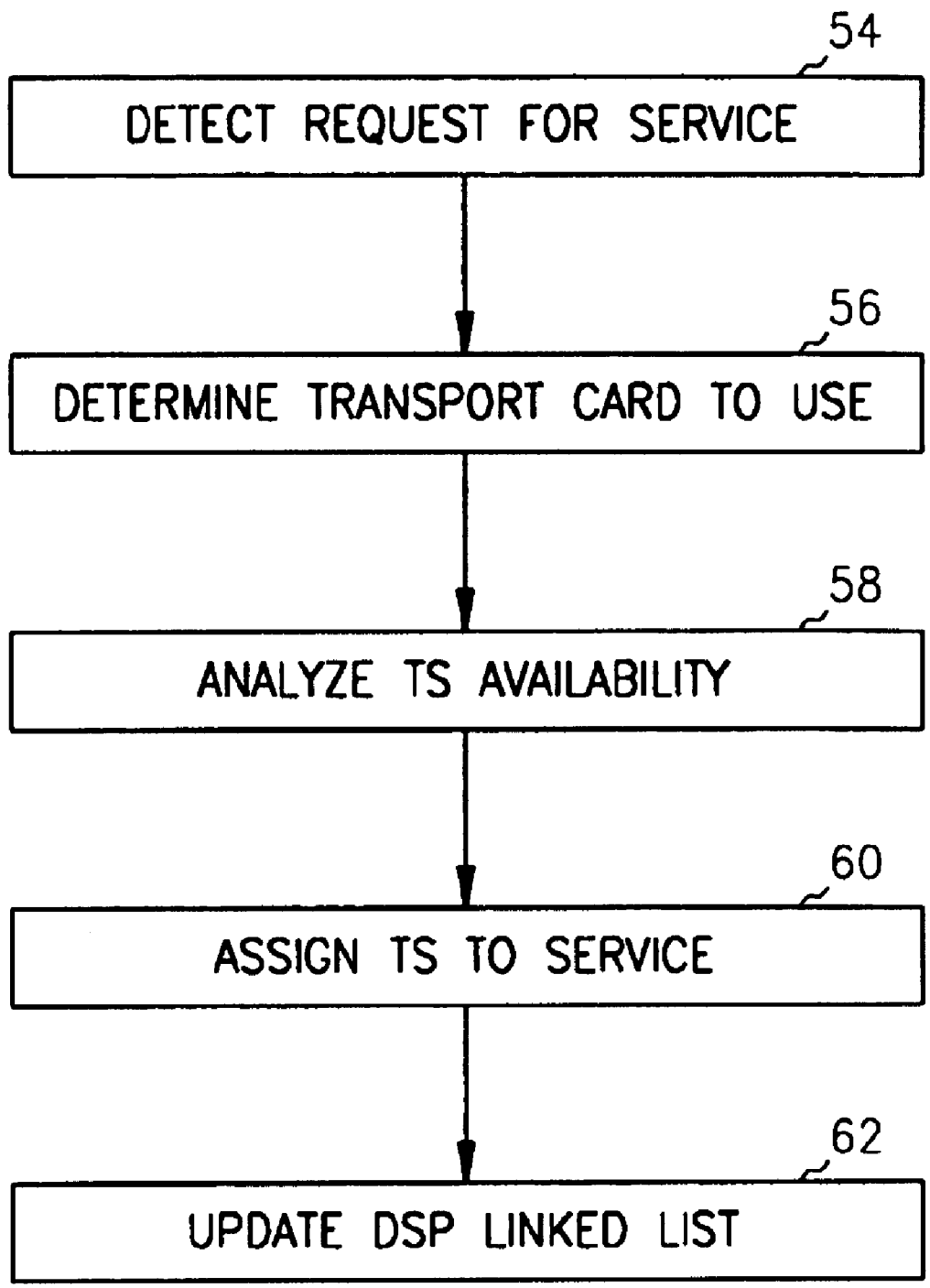
FIG. 5 is a flowchart illustrating operation of the RDT to allocate a time slot for a call.

FIG. 5 is a flow chart illustrating CPU-controlled operation of the RDT 16. Initially at Step 54, one of the service cards 46, 48, which are interrupt driven, detects a request for service from one of the subscribers 22, i.e., an off-hook condition. The CPU 36 then determines what transport card to use at Step 56 based on the level of service pre-selected by the subscriber 22. Next, time slot availability for the transport card is analyzed at Step 58. A time slot is then assigned to the service having a given default bandwidth, preferably 64 kbps, at Step 60. The linked list 51 in the DPR 38 is then updated with information on this call.

It is preferred, though not required, to allocate bandwidth on a transport card basis. Bandwidth can alternatively be allocated on a service card basis.

Figure 6:
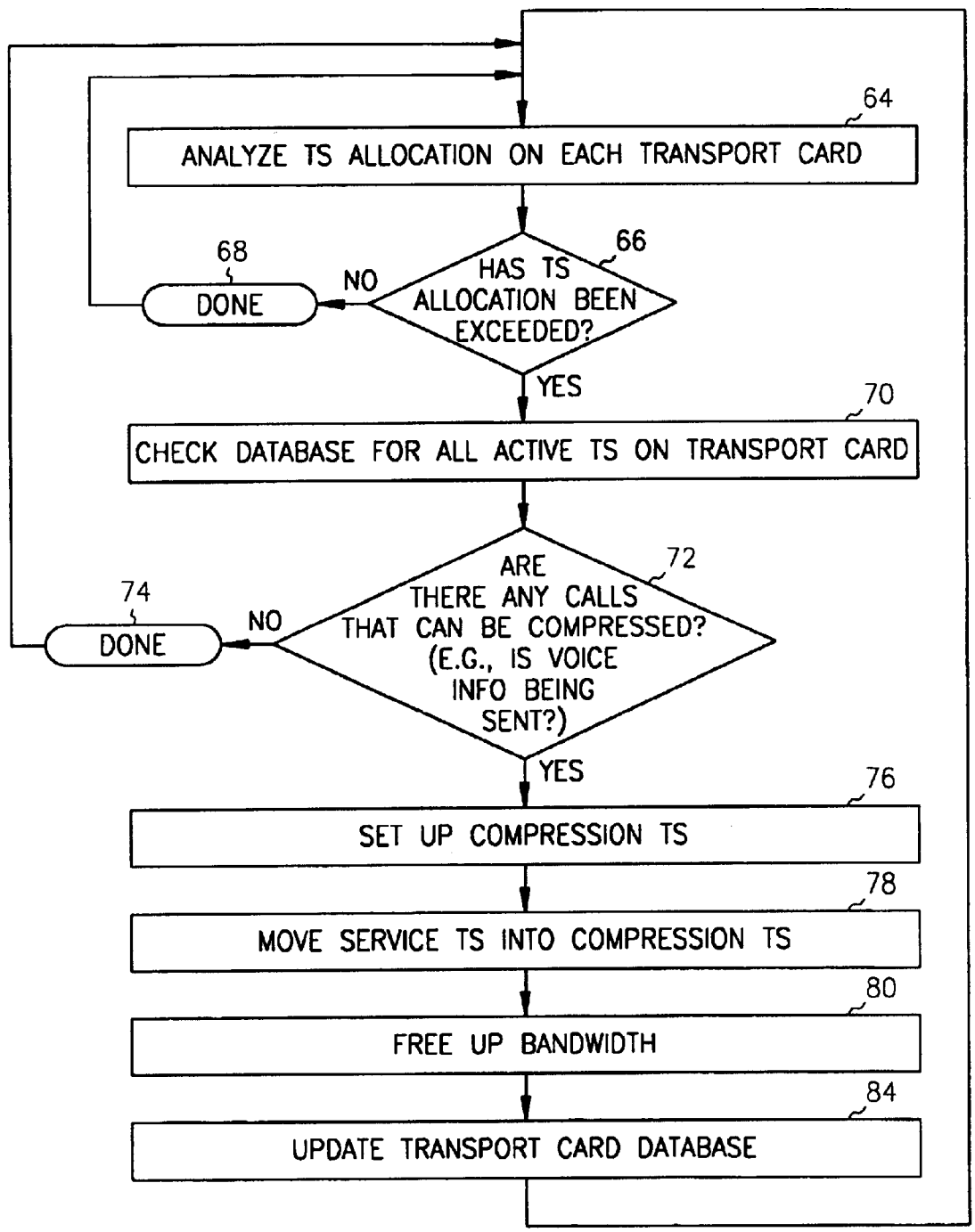
FIG. 6 is a flowchart illustrating operation of the RDT to selectively compress a call.

As shown in FIG. 6, while the call is in progress, the DSP 34 analyzes the system periodically, e.g., at every second. First, at Steps 64, 66, the time slot allocation in each transport card is analyzed to determine whether a preset threshold value relating to the transport card capacity has been exceeded. If not, the analysis for this period ends at 68. If the threshold has been exceeded, the database 40 is inspected at 70 to analyze all active time slots on the transport card. Then at Step 72, the DSP uses an algorithm to determine whether there are any active calls that can be compressed without significant degradation (e.g., primarily voice, but optionally low speed data traffic). If such calls are found, they are further analyzed to determine whether the system is authorized to compress any of these calls. (Subscribers can be given the option to have none of their calls compressed including those that can be compressed without significant degradation. In other words, each subscriber channel can be provisioned to be locked at a given bandwidth or level of service if desired.) If no calls can be compressed, the DSP analysis for this period ends at 74. If the DSP determines that a call can be compressed, a compression time slot having a reduced bandwidth (e.g., 32 kbps) is set up at 76, and the service time slot (i.e., the one currently hosting the compressible call) is moved on the fly to the compression time slot. Bandwidth on the service time slot is thus freed up for usage at Step 80. The linked list 51 in the DPR 38 is then updated at Step 84 to indicate the time slot change.

Upon reallocation of the time slot, the CPU 36 notifies the corresponding POTS service card in the CDT 12 that the signal is to be received on the new time slot.

There is no service interruption during the time slot transfer because the signal will be transmitted on two time slots (at the default bandwidth and at the compressed bandwidth) during setup of the compression time slot. The CPU instructs the POTS card to multicast the call on the two time slots until the compression algorithm is equalized. Thereafter, transmission on the default bandwidth time slot is stopped and the time slot is released. Users thereby avoid hearing noise during time slot transfer.

The circuitry for performing the compression is located on the transport cards, although this is not required. Such circuitry could optionally be implemented in firmware and software, or on the service card, or centrally located elsewhere in the shelf.

Figure 7:
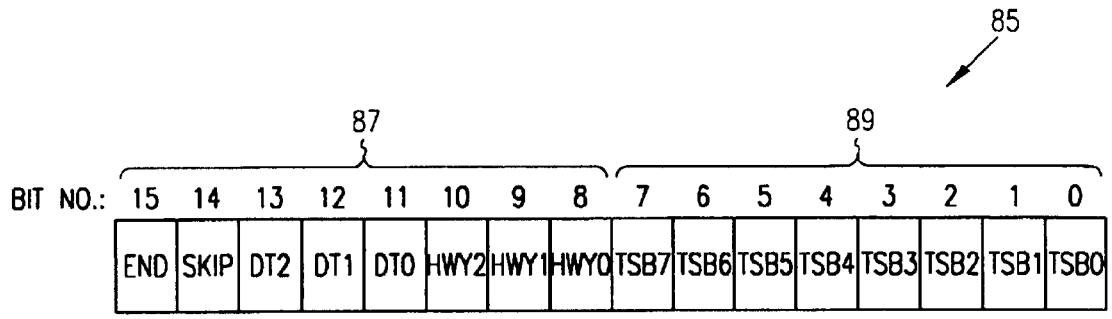
FIG. 7 is a schematic illustration of a word in the DPR linked list.
Figure 8:
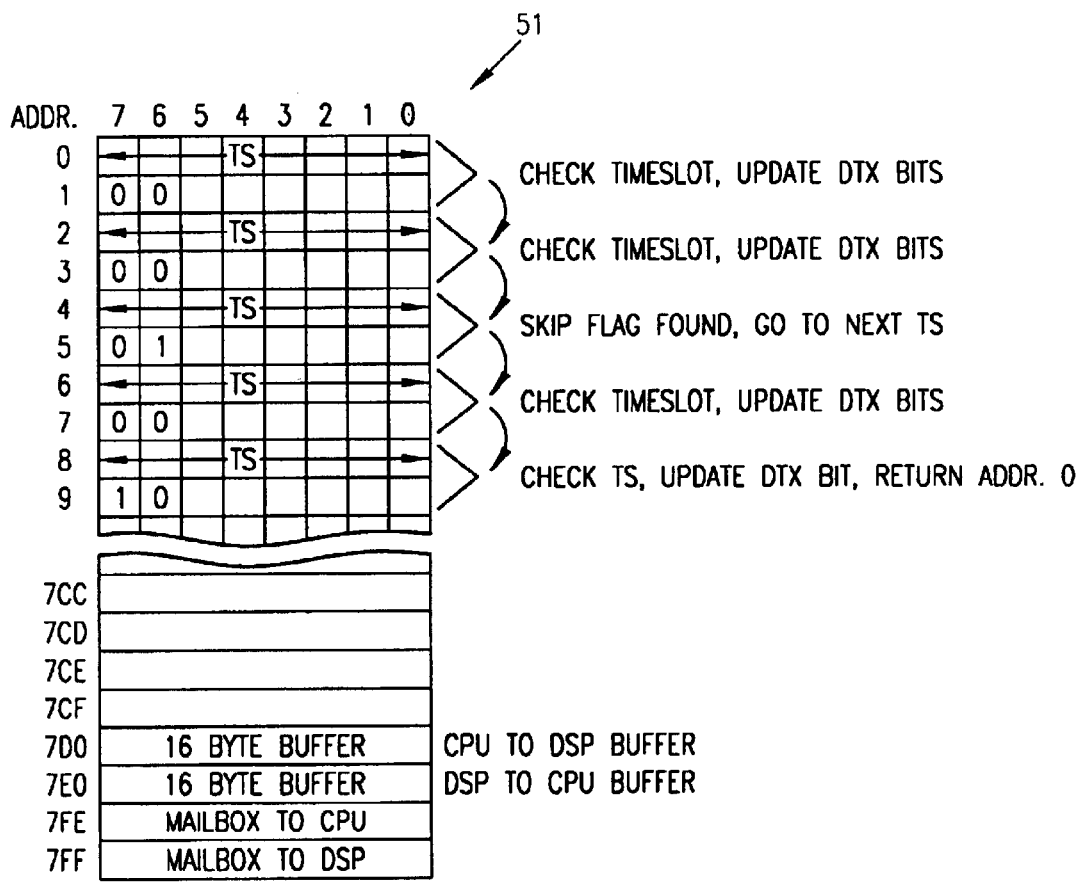
FIG. 8 is a schematic illustration of the linked list.
Figure 9:
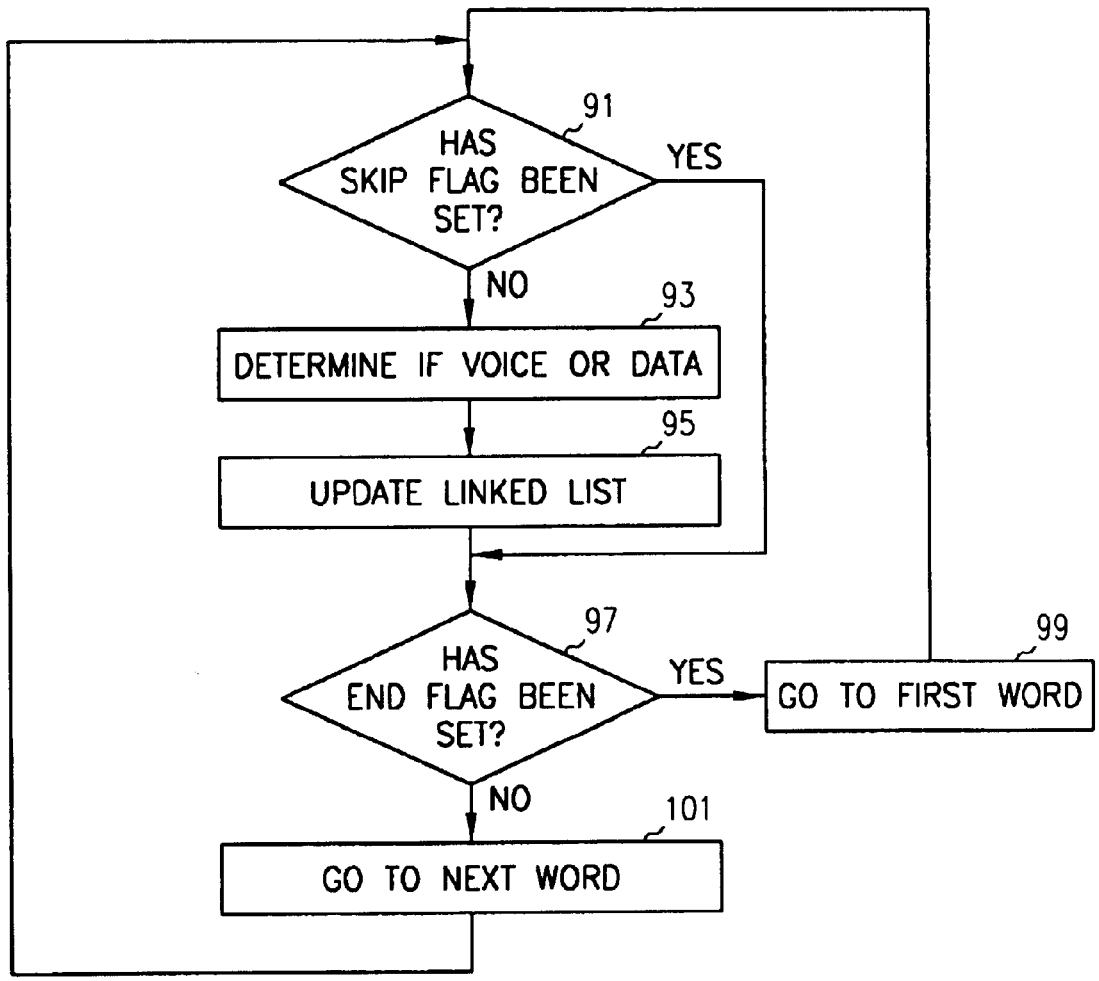
FIG. 9 is a flow chart illustrating DSP processing of the linked list.

Now referring to FIGS. 7–9, the DSP 34 controlled processing of the linked list 51 is described in greater detail. The linked list 51 is preferably comprised of a plurality of words 85, each associated with a time slot. An inventive scheme is provided for processing the linked list words.

FIG. 7 shows an example of a word 85 in the linked list 51. The word 85 preferably comprises an 8-bit high byte 87 and an 8-bit low byte 89. The low byte 89, comprising Bits 0–7, identifies a given time slot. In the high byte 87, Bits 8–10 identify the PCM highway carrying the time slot. For instance, a value of '000' for Bits 8–10 can correspond to PCM highway 1, a value of '001' can correspond to PCM highway 2, etc.

Bits 11–13 represent the type of signal carried on the time slot. For instance, a value of '001' can correspond to voice frequency and '111' to data. A value of '000' is used to indicate initialization by the CPU 36, which occurs when, e.g., a new time slot is activated.

Bit 14 is used by the CPU 36 to set the skip flag. If this bit has a value of '1', the word is to be skipped during DSP processing of the linked list 51. If the bit contains a '0', the word is considered part of the DSP 'scan list', indicating that the time slot is to be checked by the DSP 34.

Bit 15 is used by the CPU 36 to set the end flag. A bit value of '1', indicates that the word is at the end of the linked list 51, and processing of the linked list 51 is to be restarted at the first word in the linked list. A bit value of '0' indicates that further processing is to be continued at the next sequential word in the linked list.

As shown in FIG. 8, the linked list 51 comprises a plurality of words having their respective high and low bytes in adjacent 8-bit address locations. (For instance, for the first word, the low byte is located in address location 0 and the high byte in address location 1.)

The FIG. 9 algorithm illustrates processing of the linked list 51 by the DSP 34. First, at Step 91, the first word in the linked list 51 is checked to see if the skip flag (Bit 14) has been set. If it has not been set, the DSP 34 analyzes the time slot associated with that word at Step 93 to determine whether it is being used to transmit voice or data. (During call setup, a new time slot is assigned to the channel requesting service by the CPU 36, and the time slot is added to the scan list of the linked list 51, i.e., the skip flag bit is given a zero value.) Then, at Step 95, the DSP 34 updates the word by, e.g., giving Bits 11–13 (the 'Dtx' bits) a value of 001 or 111 depending on whether the signal has been found to be voice or data, respectively. Each time slot analysis by the DSP 34 takes about 100 ms to process.

If the skip flag was found to have been set in Step 91, Steps 93 and 95 are skipped to reduce unnecessary processing by the DSP 34 of time slots that have already been analyzed. Accordingly, there is a more rapid and efficient processing of the linked list.

Next at Step 97, Bit 15 is tested to see if the end flag has been set. If the end flag has been set, the end of the linked list 51 has been reached, and the analysis is begun again at the first word (e.g., at address 0) at Step 99. If the end bit has not been set, then the analysis is repeated for the next sequential word in the linked list at Step 101.

An example of linked list processing using this algorithm is illustrated in FIG. 8. For instance, as shown, for the word in address locations 0–1, the End and Skip bits both equal zero. Thus, the DSP analyzes the time slot associated with that word, updates the Dtx bits, and thereafter proceeds to analyze the next word in the list.

Figure 10:
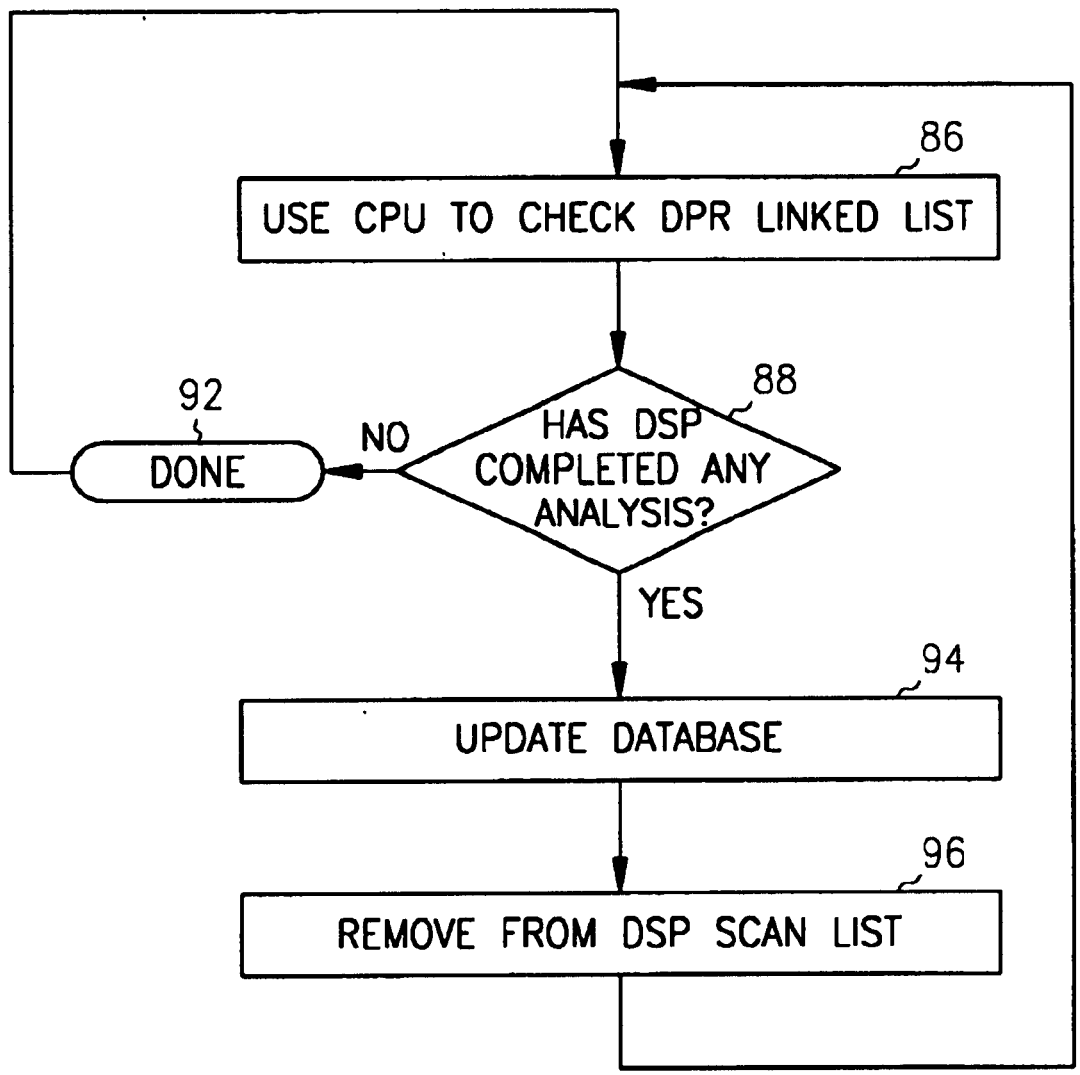
FIG. 10 is a flowchart illustrating operation of the RDT to update a database containing information on system traffic.

As shown in FIG. 10, the CPU 36 also analyzes the linked list 51 in a round robin basis (as indicated by the arrows 90) periodically, e.g., at every second. At Steps 86, 88, the CPU 36 analyzes a word in the linked list 51 to determine if an analysis of a time slot has been completed. If an analysis of a time slot has been completed, the CPU 36 updates the database 40 at Step 94 and removes the word from the linked list scan list at Step 96 by setting the skip bit. (The time slot is also removed from the scan list if the corresponding channel requests to go idle.) On the other hand, If the analysis for a time slot has not been completed, then the CPU analysis for this word ends for this cycle at Step 92, and the CPU 36 then checks the next word in the linked list 51.

A time slot analysis has been completed at Step 88 if the DSP 34 has determined that the call is voice frequency and changed the Dtx bits to indicate such. Alternatively, a time slot analysis is complete if the DSP 34 has determined that the call is data and a given "time-out" period (e.g., 10–30 seconds) has expired.

Thus, the present invention optimizes linked list processing by the DSP by avoiding unnecessary time slot analysis. Accordingly, while the system may be handling thousands of time slots at a given time, the DSP analyzes only those few time slots whose analysis has not been completed. The system is thereby able to more quickly and efficiently process the time slot linked list.

The system also preferably includes a craft interface 106 (shown, e.g., in FIG. 2), through which it can be programmed to perform selective signal compression. For instance, the system can be set up to assure that no compression takes place for any call made by a particular subscriber. In this case, all the subscriber's calls will be assigned the default bandwidth (preferably 64 kbps). A subscriber can also specify an unacceptable level of service, e.g., that no call will be assigned a bandwidth less than 32 kbps. The system can also be programmed to provide substantially greater compression, e.g., to 16 kbps, to ensure emergency service during periods of heavy usage.

The system can use two craft interface options: a menu-driven interface and a Windows based graphical user interface (GUI). The menu-driven interface can be used to access the system from any CDT or RDT with a dumb terminal, a personal computer (PC) with emulation software, or a modem. The GUI can also be used to access the system from any CDT or RDT with a PC preferably operating with Windows 95.™ The craft interface function facilitates system administration, maintenance, provisioning, and testing.

Figure 11A:
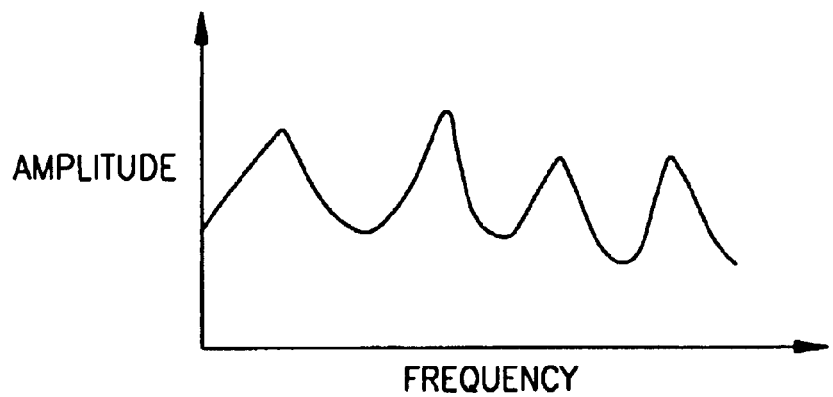
FIGS. 11A–11C are graphs illustrating use of an algorithm template to distinguish between voice and data signals.
Figure 11B:
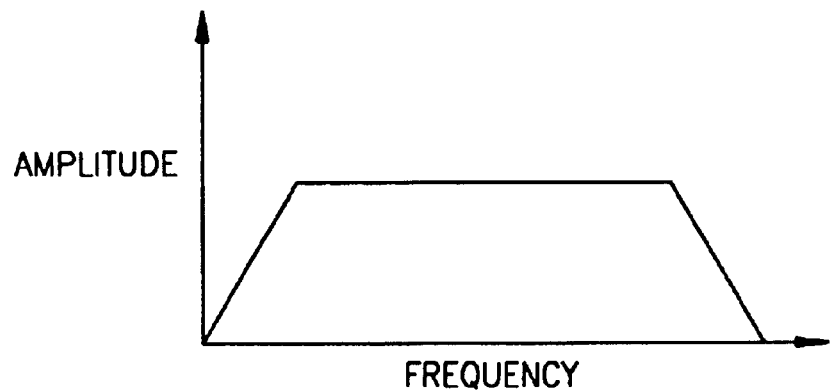
Figure 11C:
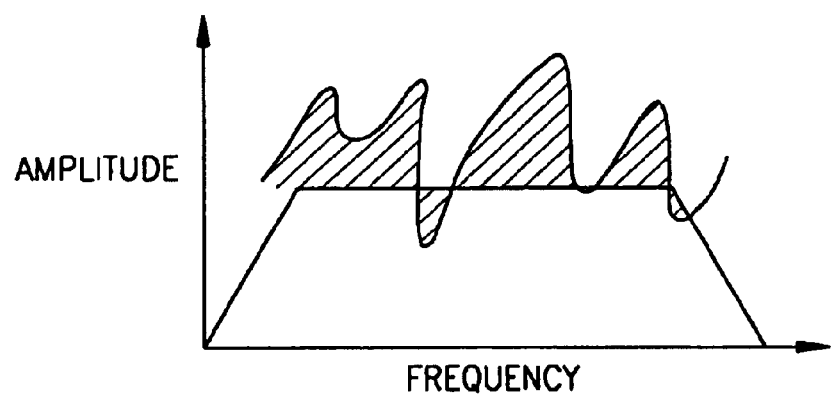

FIGS. 11A–11C are graphs illustrating use of a filtering algorithm to distinguish between voice and data calls. FIGS. 11A and 11B show generalized exemplary voice and data signals, respectively. As shown, the data signal has a substantially steady amplitude over a given frequency range compared to the fluctuating voice frequency signal. As shown in FIG. 11C, the algorithm overlays a sample signal on a data signal template. The error or difference between the signals (shown shaded) is then normalized and analyzed to determine whether it exceeds a given value. If so, the signal is identified as a voice signal. If not, the signal is identified as data.

The database 40 allows customers, i.e., operators of the DLC systems, to compile data on subscriber use of the system. The database 40 preferably is stored in non-volatile memory. Accordingly, information will not be lost if the card containing the memory is pulled out of the unit or if there is a power outage. The database 40 is preferably periodically backed-up to a remotely located main database (not shown).

Figure 12:
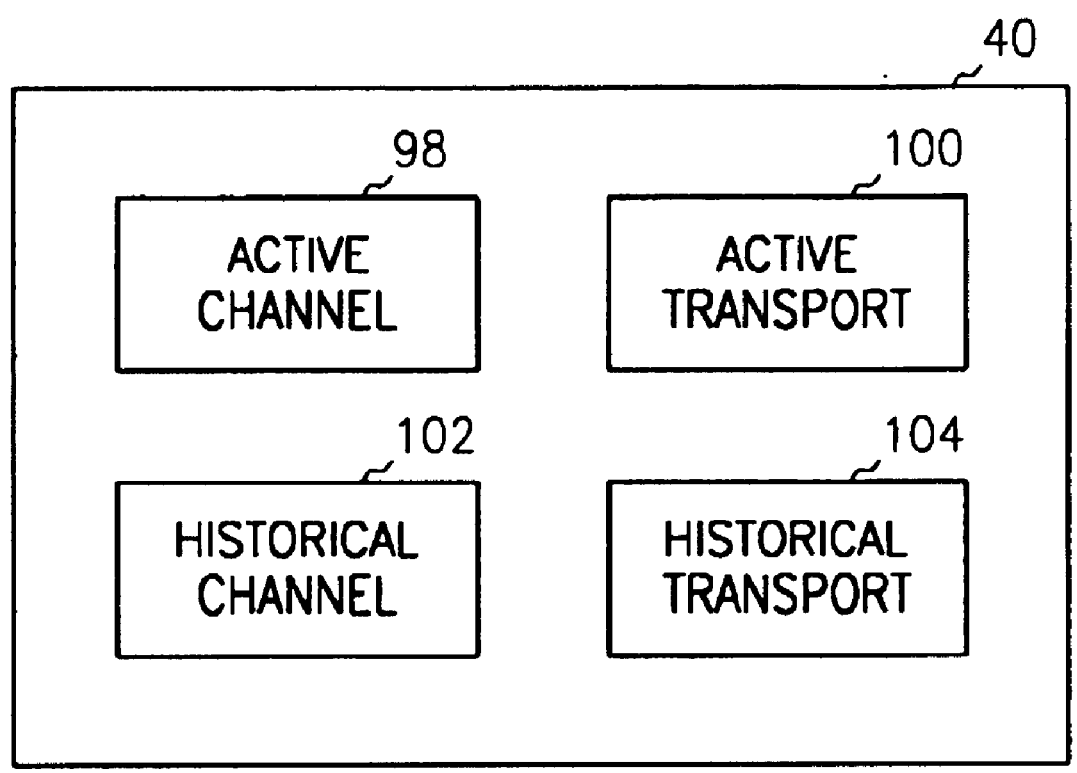
FIG. 12 is a block diagram of the database used for storing data on system traffic.

As shown in FIG. 12, the database 40 preferably is subdivided into an active channel database 98, an active transport database 100, a historical channel database 102, and a historical transport database 104.

The channel databases 98, 102 preferably contain per channel data including information on:
the number of calls at each service level;
the number of voice calls;
the number of data calls;
the lowest order of service;
the number of call minutes;
the number of average call minutes;
the number of blocked calls when system capacity is exceeded; and
customer options.

The transport databases 100, 104 preferably contain transport card data including information on:
the number of maximum time slots assigned;
the number of blocked seconds;
the minimum service level duration;
customer options;
the number of service level alarms activated when service level reaches a given bandwidth;
average call duration;
average number of active calls; and
the channel/time slot ratio.

According to the present invention, any suitable statistical method may be used to analyze collected data. Known statistical methods include, without limitation, pattern matching algorithms, fuzzy logic algorithms, an adaptive inference engine having a set of learning rules, and other known or later-developed statistical evaluation routines. The particular routine is preferably implemented in software running on a computer connected to the craft input 106. While a statistical analysis on the data is the preferred, one of ordinary skill will appreciate that deterministic analysis techniques can also be used. All such variations are within the scope of this invention.

The data collected by the system can be used by customers for network planning to keep track of system demand and needs. The data also can be used to provide incremental revenue. For example, customers can charge subscribers different rates for voice calls and data calls or can charge rates dependent on the amount of bandwidth used for a given call.

It should be noted that the data collection means described herein can be advantageously used in a variety of networks and is not limited to DLC systems.

The DLC system in accordance with the invention thus has numerous advantages. It comprises an advanced network transmission system that significantly increases local loop capacity and allows communications providers to meet increasingly high demands for service and reliability.

The system is economical and flexible, making it ideal both for upgrades to existing networks and for new applications. It adds value to existing DLC systems by maximizing use of existing carrier line infrastructure. It can be expanded quickly and easily, and deployed in a variety of configurations including point-to-point, star, and drop and insert or any combination of these network topologies. The system is designed with redundancy, inter-shelf connectivity, and shared system intelligence.

The system operates on a variety of transport or carrier media including copper (supporting a variety of protocols including MDSL, ADSL, HDSL, and T1), fiber, coax, and wireless. It provides a high pair gain (e.g., 48:1) over a single twisted pair. It also enables a large number (e.g., 44–88) of simultaneous off-hook voice connections per twisted pair.

In addition, the system units furnish higher channel capacity in less space, and are easy to install, use, and maintain.

The system also advantageously provides a means for collecting data on usage to facilitate network planning and costing.

Having thus described our invention, what we claim as new and desire to secure by letters patent is set forth in the following claims.

What is claimed is:

1. An apparatus for efficiently managing bandwidth in a digital loop carrier system, comprising:
    a memory containing a linked list of words, each word being associated with a time slot allocated to a call transported by the digital loop carrier system;
    means for analyzing a time slot to determine whether a call allocated to the time slot is a voice or data call;
    means for identifying words in the linked list whose associated time slots have not been analyzed by the means for analyzing; and
    means for modifying a word to indicate whether the time slot associated therewith has a voice or data call allocated thereto once the time slot has been analyzed by the means for analyzing.

2. The apparatus of claim 1 wherein the means for identifying include means for flagging words analyzed by the means for analyzing, and means for searching said linked list for words that are not flagged.

3. The apparatus of claim 2 further including means for removing flagged words from said linked list.

4. The apparatus of claim 1 further including means for removing a word from the linked list when an on-hook condition is detected for a call.

5. The apparatus of claim 1 further including means for adding a word to the linked list when an additional time slot is needed to host a new call.

6. The apparatus of claim 1 further comprising a database and means for storing information from the linked list in said database.

7. The apparatus of claim 1 wherein the means for analyzing comprise a digital signal processor.

8. The apparatus of claim 1 wherein the memory comprises a dual port random access memory accessible by two processors.

9. The apparatus of claim 4 wherein one of said processors is a digital signal processor and the other of said processors is a central processing unit.

10. A method for efficiently distinguishing between voice and data calls for bandwidth management in a digital loop carrier system, comprising the steps of:
    (a) generating a linked list of words, each word being associated with a time slot allocated to a call transported by the digital loop carrier system;
    (b) identifying a word in the linked list whose associated time slot has not been analyzed to determine whether a call to which the time slot is allocated is a voice or data call;
    (c) analyzing the time slot associated with the word identified in Step (b) to determine whether the call to which the time slot is allocated is a voice or data call;
    (d) modifying the word whose time slot has been analyzed in Step (c) to indicate whether the call to which the time slot is allocated is a voice or data call; and
    (e) repeating Steps (b), (c) and (d).

11. The method of claim 10 further comprising flagging words analyzed by in Step (c), and wherein Step (b) comprises searching the linked list for words that are not flagged.

12. The method of claim 11, further comprising the step of periodically scanning the linked list to identify flagged words and removing said flagged words from the linked list.

13. The apparatus of claim 10 further including the step of removing a word from the linked list when an on-hook condition is detected for a call.

14. The method of claim 10 further including the step of adding a word to the linked list when an additional time slot is needed to host a new call.

15. The apparatus of claim 10 further comprising the step of storing information from a word in a database.

16. The method of claim 10 wherein Step (c) utilizes a digital signal processor.

17. The method of claim 10 wherein the linked list is stored in a dual port random access memory accessible by two processors.

18. The method of claim 17 wherein one of said processors is a digital signal processor and the other of said processors is a central processing unit.

19. A digital loop carrier system, comprising:
    transport cards connectable by a communications medium;
    a plurality of service cards, a subset of which are connected to a transport card having a given bandwidth capacity, each of the service cards supporting at least a plurality of channels;
    a bandwidth manager comprising:
        means for allocating a first initiated call to a given time slot of a transport card;
        means for assigning the given time slot a given default bandwidth;
        means for determining whether the call is voice or data while the first call is in progress; and
        means for selectively reducing the given default bandwidth allocated to the first call if the first call is voice and if necessary to ensure that a second call initiated, while the first call remains in progress, can be assigned the given default bandwidth;
    a memory containing a linked list of words, each word being associated with a time slot;
    means for periodically identifying words in the linked list whose associated time slots have not been analyzed by the means for determining; and
    means for modifying a word to indicate whether the time slot associated with the word has a voice or data call allocated thereto once the time slot has been analyzed by the means for determining.

20. The digital loop carrier system of claim 19 wherein the communications medium comprises a protocol selected from a group of protocols consisting essentially of ISDN, MDSL, T1, HDSL, ADSL, OC3, OC12 and OC48.

21. The digital loop carrier system of claim 19 wherein the given default bandwidth is 64 kbps.

22. The digital loop carrier system of claim 19 wherein at least one of said service cards provides a service selected from a group of services consisting essentially of Plain Old Telephone Service (POTS), coin service, broadband service, ISDN service, UV6 service, frame relay service, and ATM service.

* * * * *